March 29, 1932.　　　G. W. POPPE　　　1,851,060

PROCESS AND MACHINE FOR MAKING BAGS

Filed Dec. 16, 1930　　6 Sheets-Sheet 1

INVENTOR
GEORGE W. POPPE
BY Newell & Spencer
ATTORNEY

March 29, 1932.  G. W. POPPE  1,851,060
PROCESS AND MACHINE FOR MAKING BAGS
Filed Dec. 16, 1930   6 Sheets-Sheet 2

INVENTOR
GEORGE W. POPPE
BY Newell & Spencer
ATTORNEY

March 29, 1932.  G. W. POPPE  1,851,060
PROCESS AND MACHINE FOR MAKING BAGS
Filed Dec. 16, 1930   6 Sheets-Sheet 3
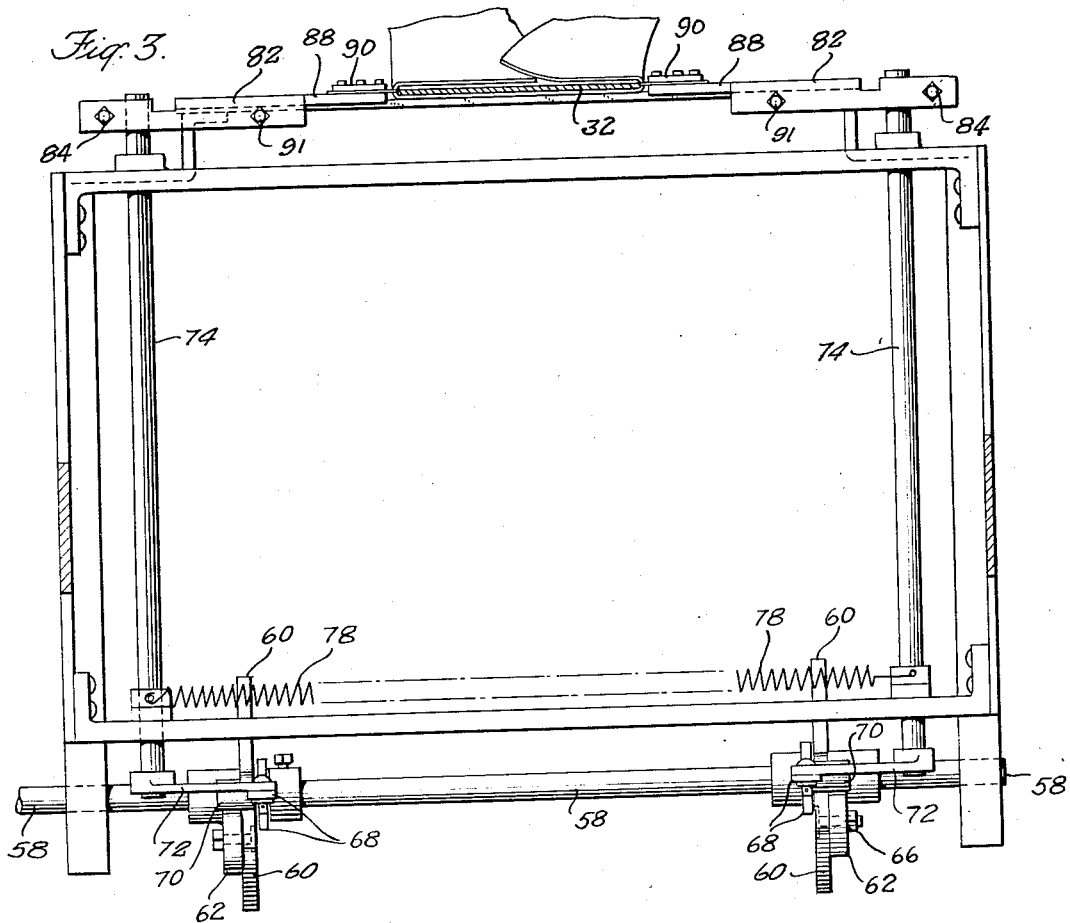
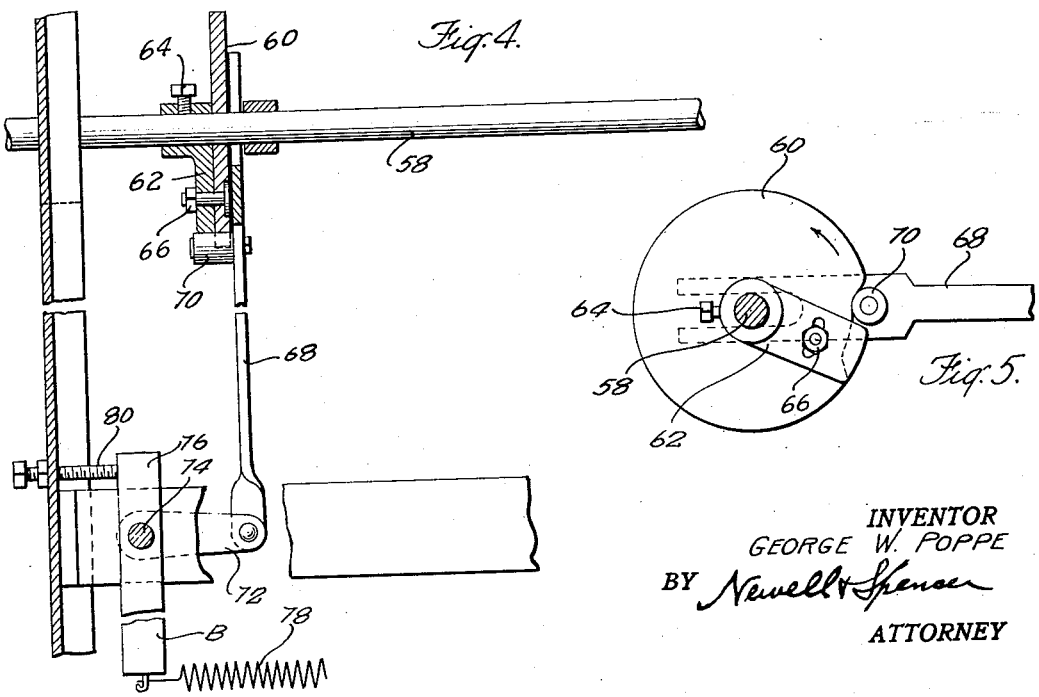
INVENTOR
GEORGE W. POPPE
BY Newell & Spencer
ATTORNEY March 29, 1932. G. W. POPPE 1,851,060
PROCESS AND MACHINE FOR MAKING BAGS
Filed Dec. 16, 1930 6 Sheets-Sheet 4

INVENTOR
GEORGE W. POPPE
BY Newell & Spencer
ATTORNEY

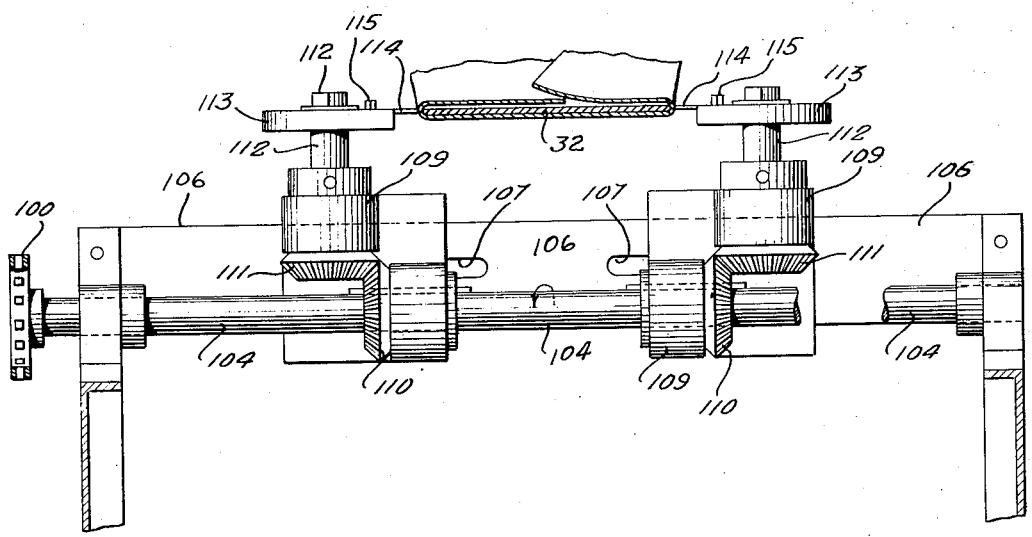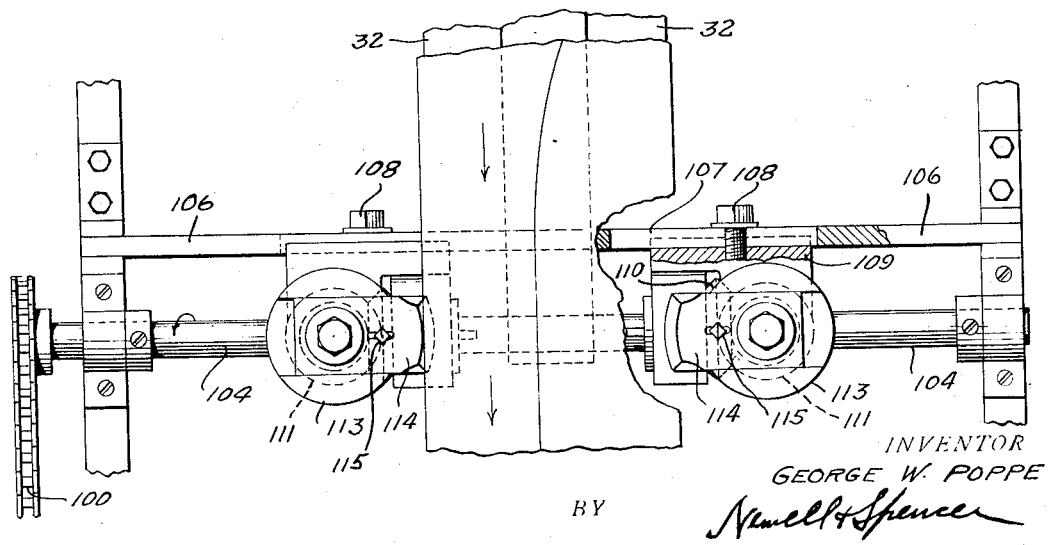

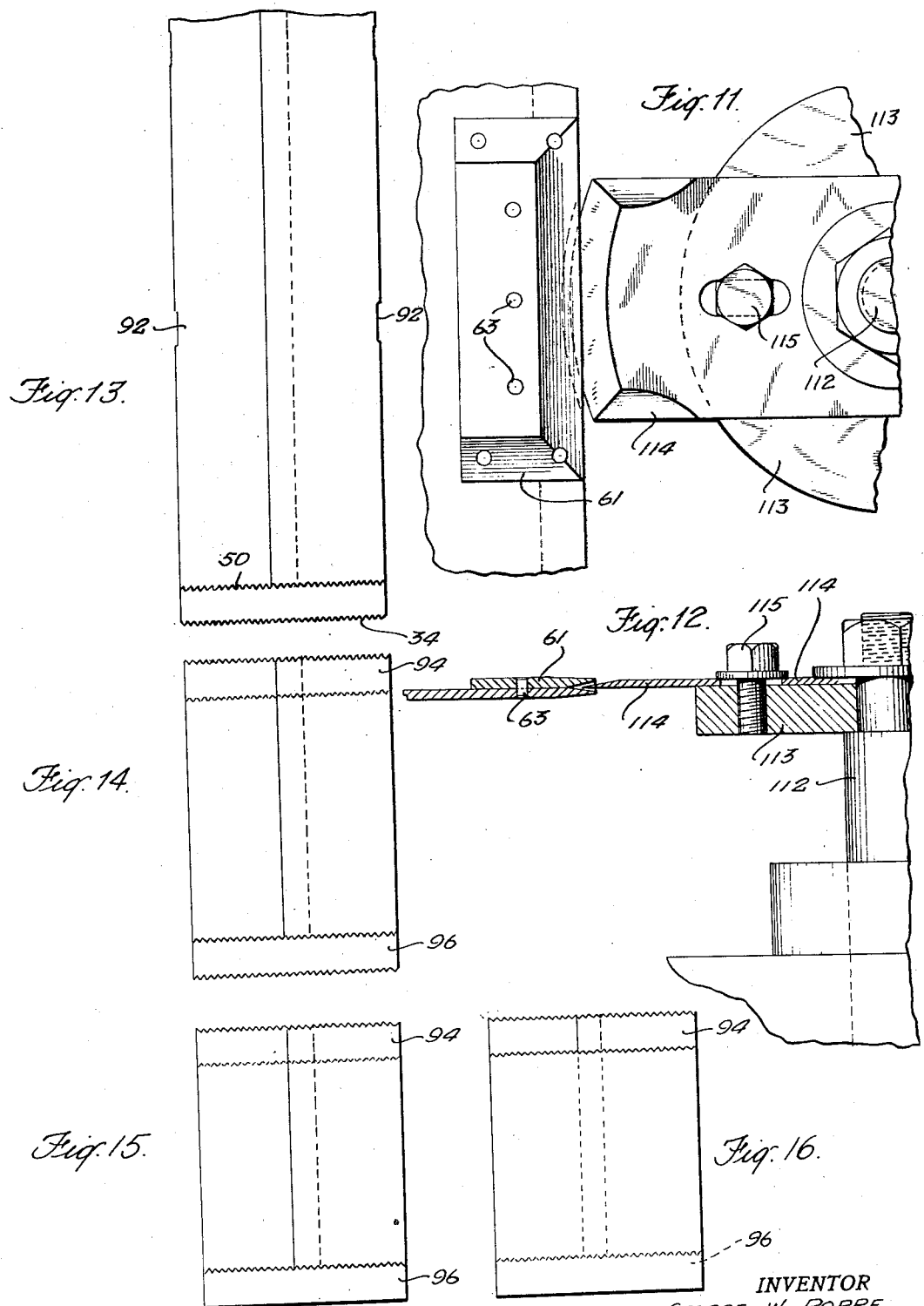

Patented Mar. 29, 1932

1,851,060

UNITED STATES PATENT OFFICE

GEORGE W. POPPE, OF BROOKLYN, NEW YORK, ASSIGNOR TO EQUITABLE PAPER BAG CO. INC., OF BROOKLYN, NEW YORK, A CORPORATION OF NEW YORK

PROCESS AND MACHINE FOR MAKING BAGS

Application filed December 16, 1930. Serial No. 502,722.

This invention relates to a process and machine for making paper bags and the like. More specifically the invention is directed to a modification of the process and machine shown in my co-pending application Serial No. 316,462, filed November 1, 1928, for process and machine for making paper bags.

In said application I have disclosed a form of machine in which the paper web is slit or die-cut prior to being folded to form the usual bag tube.

In the present application is shown a machine in which the bag tube, as distinguished from the web, is cut or slit just prior to the so-called chopping operation.

The machine to be described herein is of a well known type of bag machine with some of the parts modified and other parts added to facilitate the making of bags according to the present invention.

It may be stated that in the practical art of bag manufacture a distinction is made between bags and envelopes due principally to the process and machines for making the two separate types of receptacles. In the practical art envelopes are formed in such a way that the flaps forming the bottom closure and the free flap at the top are a continuation of the web from which the envelope is formed and both the closing flap and the free flap fold on the same side of the completed article.

In the practical art, paper bags, on the other hand, are formed by first folding a web of paper to form a bag tube and holding the bag tube under tension in engagement with cutting edges of suitably arranged knives and subjecting the tube to a sudden blow which severs it along lines of engagement with the knives.

In so far as I am aware paper bags prior to the disclosure in the said application above referred to have been provided with a very short flap and one whose outer edge is continuous. A bag so made, however, does not provide a flap of sufficient overlap to protect the corners of a bag and afford the necessary protection to the bag contents. Consequently, when protection for the bag contents is required, envelopes have been gener50 ally used instead of bags, although due to the waste in the process of manufacture and to the slower operation of the machine in making them, they are more costly than bags.

By the process and machine described in my said application and by the machine which will be described in the present application bags having long flaps can be produced as rapidly as ordinary bags and without any waste of material.

The invention will be more fully understood by reference to the accompanying drawings, in which Figure 1 is a section on the line 1—1 of Figure 2;

Figure 3 is a section on the line 3—3 of Figure 1;

Figure 4 is a section on the line 4—4 of Figure 1;

Figure 5 is an enlarged detail view of a portion of the cam structure for reciprocating the knives;

Figure 9 is an elevation of the rotary knives and their mountings;

Figure 10 is a plan view of the same;

Figure 11 is an enlarged detail of a portion of one of the rotary knives and a portion of the former;

Figure 12 is a longitudinal section of the parts shown in Figure 11;

Figure 13 is a portion of the bag tube showing the appearance of the same just after a bag has been severed therefrom;

Figure 14 shows a bag length severed from the tube;

Figure 15 is a similar view with the bottom of the bag closed; and

Figure 16 is a reverse view of the bag shown in Figure 15.

Figure 1:
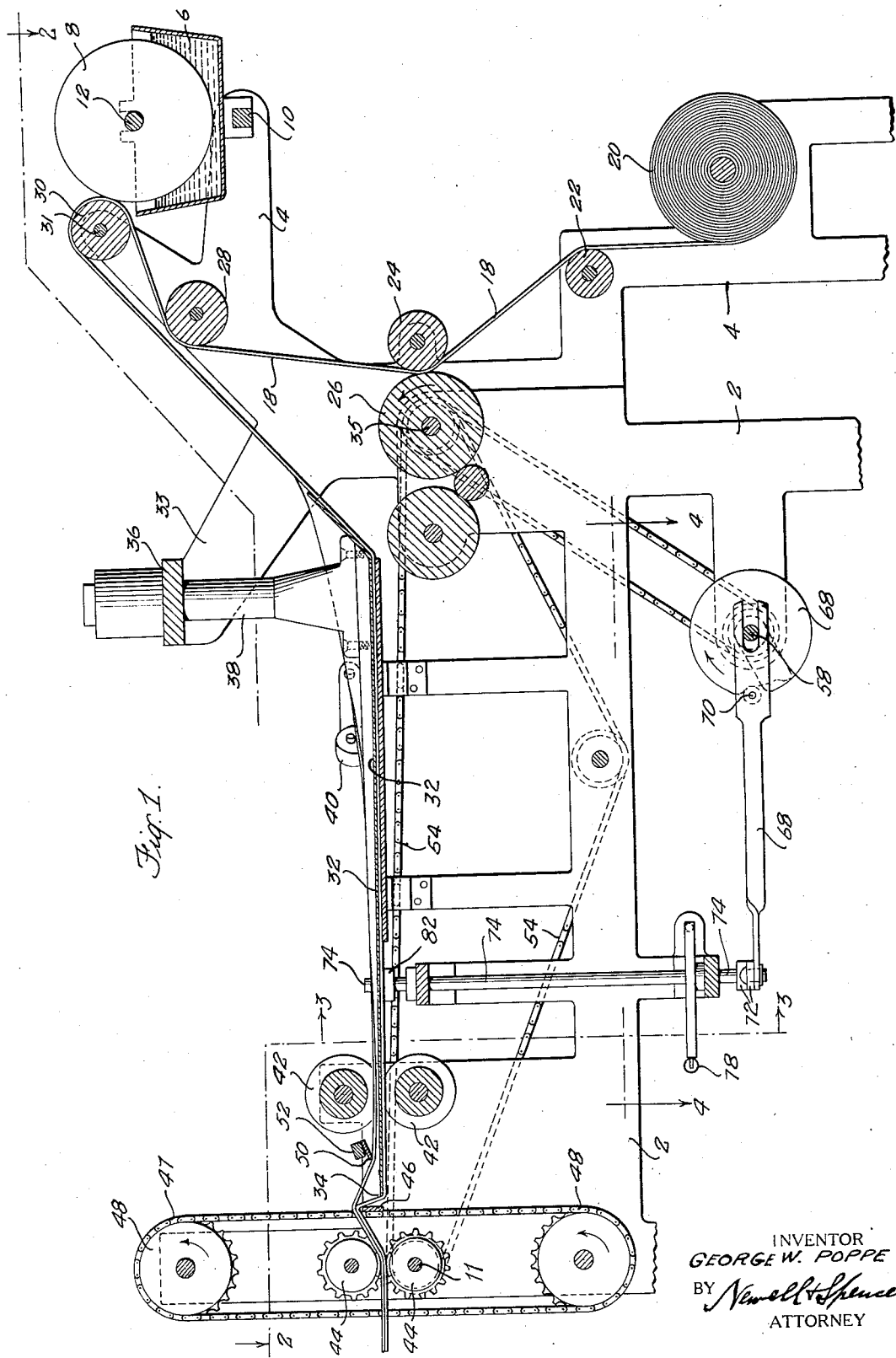
Figure 2:
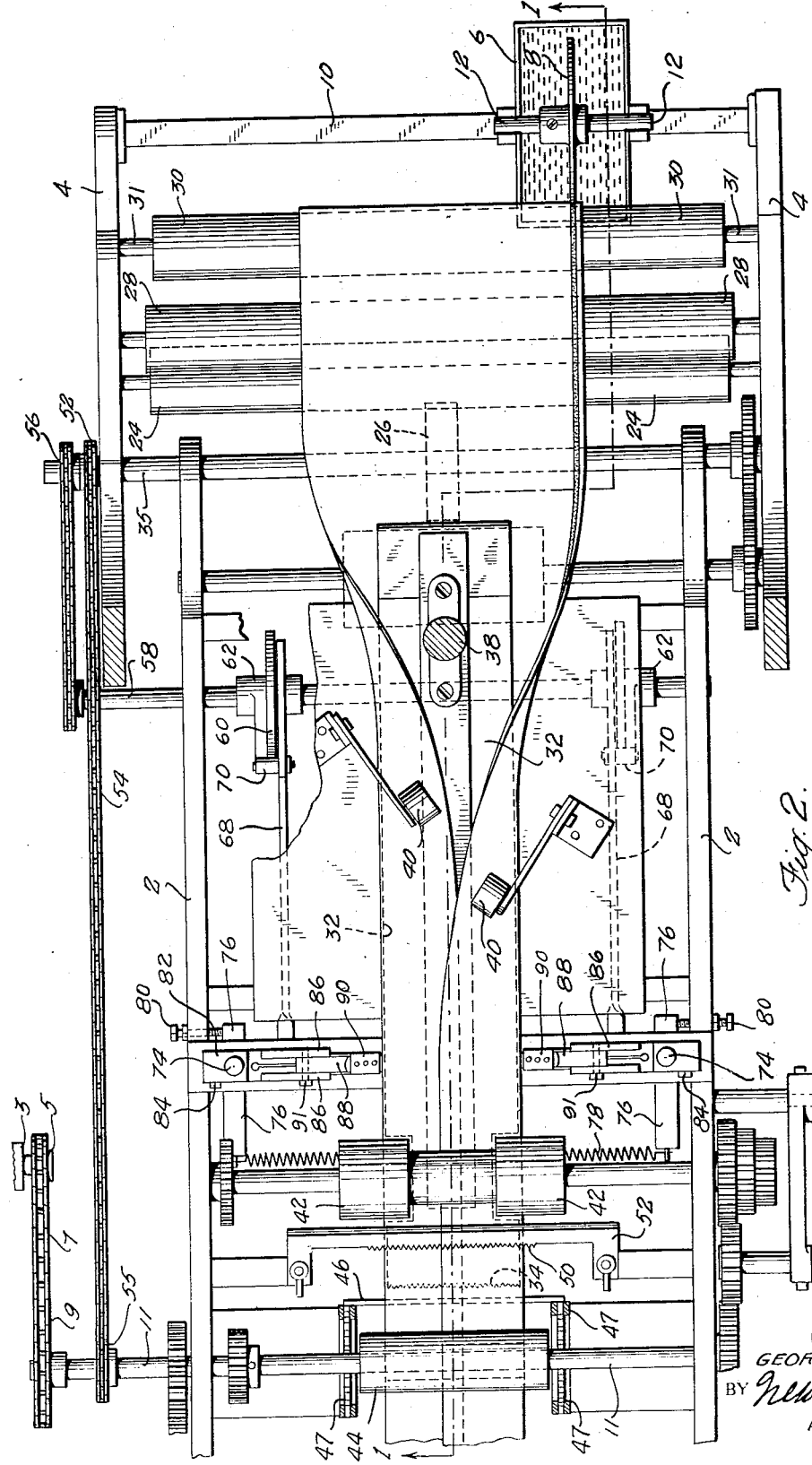
Figure 2 is a view in plan with some parts in section on the line 2—2 of Figure 1.

Before describing the parts concerned with the present invention, brief mention will be made of the more important parts of a known bag machine to which my invention is applied. Referring to Figure 1, there is a supporting framework 2 and running transversely between the side members of this framework are a number of shafts for operating the various mechanisms, all of which are suitably driven from a motor 3 driving a pulley 5 which is connected by a belt 7 to another pulley 9 on shaft 11. The paper from which the bags are to be formed is fed as a web 18 from a roller 20, which web passes over a guide roller 22 and between rollers 24 and 26 which may be ordinary feed rollers. In some cases, however, the roller 26 may carry a printing device for printing suitable matter on the web at such distances apart that it properly appears on each finished bag. The web passes over a roller 28 and around another roller 30 which reverses its direction of movement, the latter roller being supported on a shaft 31. As the web passes around the roller 30 paste is applied thereto from a paste pot 6 into which dips a narrow disk 8, Figure 2. The disk 8 is carried by a shaft 12 supported in bearings carried by the pot 6, the whole being adjustable on a bar 10 carried by an upper arm 4 of the main frame. The paper web after passing over the roller 30 is delivered to the former mechanism which includes a former 32 whose outer end 34 is serrated and forms the cutter for severing the under side of the bag tube. The paper web passes under this former and is folded over it due to the shape of the entering edges, as indicated in Figure 2. The former is supported from an arm 33 forming part of the main frame, which frame carries a bar 36 to which is attached a post 38 to which the former is secured. As the web is folded over onto the former it is engaged by rollers 40. It then passes on as a tube between two feed rollers 42. Beyond the feed rollers the tube is momentarily retarded between two members known as pinch bars 44. These so-called pinch bars, which are in fact rollers with segments set into them over a short portion of their periphery, are so geared that when the tube is engaged between the two segments it is slightly retarded and it is at this time that the so-called chopping is effected. For this purpose a striker bar 46 attached to a sprocket chain 47 passes over sprocket wheels 48, strikes a sharp blow to the under side of the tube and causes the under wall thereof to be severed by the edge 34. At substantially the same time the upper wall of the tube encounters the serrated edge of a second knife 50 supported on a bar 52, Figures 1 and 2, which in turn severs the upper wall of the tube.

Up to this point the machine described is the ordinary type of bag machine but the present machine differs from it in that the knife 50 is set back a greater distance from the edge 34 of the former in order that the finished bag may have a long flap. It may be stated that in the ordinary paper bag machine the edge of the knife 50 is placed so close to the edge of the former blade and the former is so curved that the two cuts made by the separate cutting knives meet at the sides of the bag. As previously stated, however, this form of bag produces a short lip and the edges of the lip do not sufficiently cover the corners of the bag to properly protect their contents. To make a long lipped bag in a practical manner cuts or slits are preferably made in the bag tube.

In the present invention I have shown two forms of tube cutting or slitting mechanism, one acting through reciprocatory knives and the other through rotary knives. The reciprocatory form will be first described.

Figure 6:
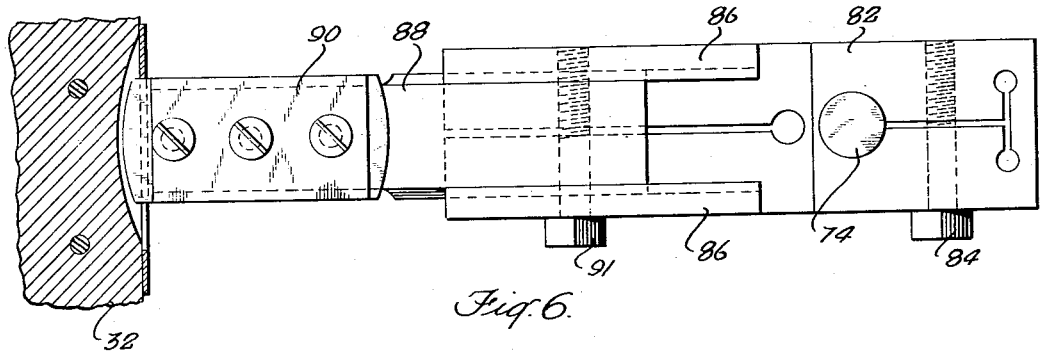
Figure 6 is a plan view somewhat enlarged of the reciprocating knife for making slits in the bag tube.
Figure 7:
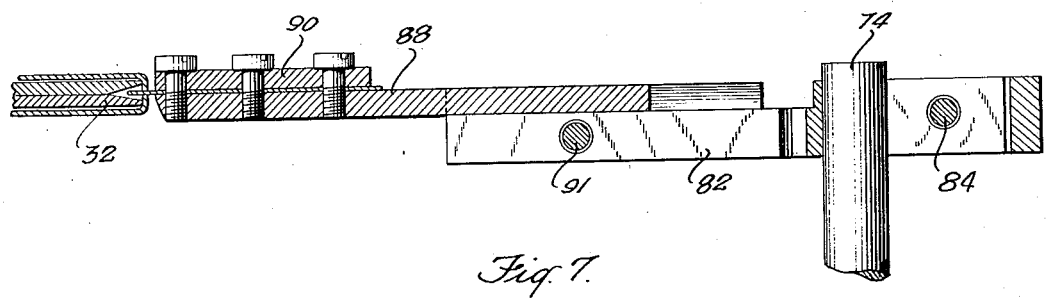
Figure 7 is a longitudinal section of the parts shown in Figure 6.
Figure 8:
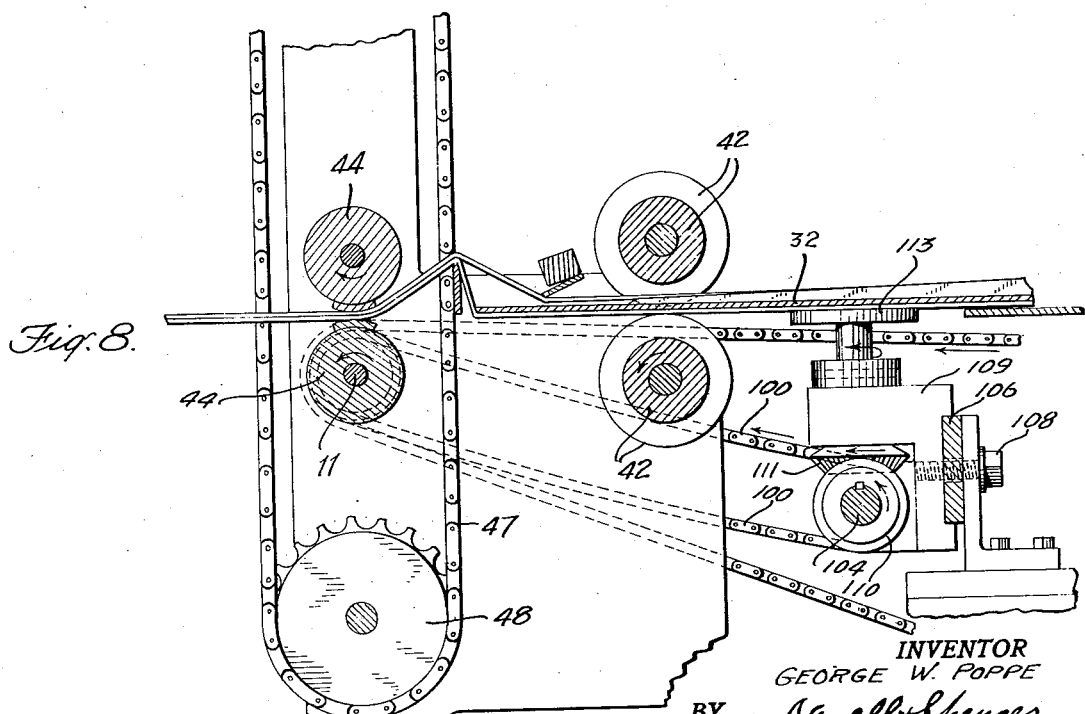
Figure 8 is a sectional detail of a modified construction in which the knives are rotated instead of reciprocated as in the previous form.

Shaft 35 which carries the roller 26 is provided with a sprocket wheel 52 over which passes a sprocket chain 54 leading from a sprocket wheel 55 on shaft 11. Another sprocket wheel 56 on the shaft 35 transmits motion to shaft 58. The shaft 58 carries two cams 60, one of which is shown in detail in Figure 5 and in elevation and section in Figures 3 and 4. The cam is circular for most of its periphery but has a short depressed portion whose extent of action may be varied by an arm 62 adjustably secured to the shaft 58 by a screw bolt 64 and adjustably secured to the cam 60 by a similar screw bolt 66. A pitman 68 is forked as shown in Figure 1 and engages the shaft 58 and is provided with a roller 70 for engagement with the cam 60. At its left end, as shown in Figure 1, the pitman is pivoted to arm 72 secured to a shaft 74 which latter is connected to the knife holders for reciprocating the knives. There is one of these shafts 74 on either side of the machine as shown in Figure 3, the shafts being supported in the framework at their upper and lower portions. Near their lower portions each shaft carries an arm 76, Figure 4, the arms being connected by a spring 78. A screw 80 passing through the side framework, engages one end of the arm to limit the rocking of the shafts 74 under action of the spring 78. Normally the spring 78 tends to move the shafts 74 to render the knives active and this occurs during the time the depressed portion of the cam 60 is in engagement with the roller 70 as shown in Figure 5. During the rest of the rotation of the cam 60, however, the shafts 74 are held against the tension of their spring 78 by the peripheral surface of the cam because it is only at bag length intervals that the slitter knives are rendered active to make short slits in the edge of the bag tube, these slits being of a length corresponding to the length of the flap desired. By adjusting the arm 62 a longer or shorter cut will be made, as will be readily appreciated. For finer adjustment the screws 80 may be moved in or out. The knives themselves are supported by holders 82, Figures 3, 6 and 7, each holder having a longitudinal split adjacent the hole through which the shaft 74 extends, a clamp screw 84 serving to clamp the holder to the shaft. The holder has undercut guides 86 with which the knife supporting member 88 engages, the knife itself being shown at 90 and may consist of an ordinary razor blade, such for instance as the familiar Gillette blade, which is merely screwed to the knife supporting member 88 as clearly shown in Figure 6. The knife supporting member 88 is adjustable along the guides 86 by means of a clamp screw 91. In order that the knives may be free to cut through the tube as it passes along the former 32, short shallow recesses are provided as indicated in Figures 6, 11 and 12. A thin plate of steel 61 overlies the former adjacent the knives. This is beveled at the under side as shown in Figure 12, the former being also beveled for a short portion of its length adjacent the plate, the latter being secured to the former by rivets 63.

From the above it will be obvious that as the cam 60 rotates the knives will be reciprocated and during the time that the roller 70 occupies the lower part of the cam the cutting edges of the knives will be effective to make the proper length of slit. Referring now to Figure 2 it will be noted that these slits are made just prior to the time of the severance of the tube to form separate bags.

Figure 13 shows a portion of a bag tube having slits 92 formed in the sides thereof and also shows the appearance of the tube just after a bag length has been severed. The portion indicated at 50 represents the serrations made by the knife 50 in the upper wall of the bag tube. 34 indicates the serrations in the lower wall of the bag tube made by the edge 34 of the former. The distance between these two series of serrations determines the length of the bag flap, which flap is indicated at 94 Figure 14. Figure 14 represents the condition of the bag after complete severance thereof from the tube. The lower portion 96 of the bag shown in Figure 14 corresponds to the bottom portion of the bag which when folded over forms the finished bag of Figure 15. Figure 16 shows the same bag from the reverse side. It will be noted that the bottom flap 96 is folded over against the upper wall of the tube while the flap 94 is adapted to be folded back over the other wall. This will be clearly understood by a comparison of Figures 15 and 16.

In the form of device shown in Figures 8 to 12 rotary cutters are used as distinct from reciprocatory cutters. The lower pinch bar 44 carries a sprocket wheel about which a sprocket chain 100 passes, Figure 10, which chain engages a sprocket wheel 102, Figure 8, on shaft 104 suitably supported in the side frames as indicated in Figure 9. The side frames also carry a bar 106 extending across the entire machine, said bar being provided with two longitudinal slots 107, Figure 9. A nut bolt 108, one for each knife support, is provided and passes through a slot 107 and into a knife support 109 as shown most clearly in Figures 8 and 10. The support 109 forms a bearing for a beveled gear 110 which is splined to the shaft 104 so that it may move therealong as the support 109 is moved along the bar 106. The support also forms a bearing for another beveled gear 111, the shaft 112 of which carries at its upper end a disk 113 to which the knife 114 is secured by a screw 115. The parts just described are duplicated as indicated in Figure 9 and the timing and adjustment of the parts is such that each knife makes the desired length of cut upon each rotation of the shaft 104.

The bar 52, Figure 2, may be moved back and forth for varying the length of flap and bars having knives of different shape may be used. The former also may have its cutting edge 34 varied to produce different shaped bag lips.

It is of course to be understood that other variations may be resorted to within the scope of the invention without departing from the spirit thereof.

What is claimed as new is:

1. A process of making paper bags which comprises folding a web of paper to form a bag tube, slitting the tube at opposite sides and severing both walls of the tube along lines which connect opposite ends of the slits.

2. In a bag machine, the combination with bag tube forming mechanism, means for making slits in the tube and offset choppers for severing the tube into bag lengths, said choppers acting to sever the respective walls of the tube along lines which connect opposite ends of the slits.

3. In a bag machine, the combination with bag tube forming mechanism, of reciprocatory slitters for making slits in the opposite edges of the tube and transverse cutters to sever the tube along lines which meet opposite ends of the slits.

4. In a bag tube machine the combination with bag forming mechanism, of rotary slitters for making slits in the opposite edges of the tube, and transverse cutters to sever the tube along lines which meet the opposite ends of the slits.

Signed at New York city, New York, this 18th day of November, 1930.

GEORGE W. POPPE.